United States Patent
Corfitsen

[19]

[11] Patent Number: 5,829,495
[45] Date of Patent: Nov. 3, 1998

[54] ADAPTER FOR AUTOMATIC FUELING OF VEHICLES

[75] Inventor: Sten Corfitsen, Lidingö, Sweden

[73] Assignee: Autofill Patent AB, Stockholm, Sweden

[21] Appl. No.: 776,877
[22] PCT Filed: Aug. 4, 1995
[86] PCT No.: PCT/SE95/00908
§ 371 Date: Feb. 10, 1997
§ 102(e) Date: Feb. 10, 1997
[87] PCT Pub. No.: WO96/05135
PCT Pub. Date: Feb. 22, 1996

[30] Foreign Application Priority Data

Aug. 11, 1994 [SE] Sweden ................................. 9402689

[51] Int. Cl.⁶ .............................. B67D 5/08; B60K 15/04
[52] U.S. Cl. .......................... 141/348; 141/98; 141/368; 220/86.2; 901/6
[58] Field of Search ............................. 141/98, 312, 348, 141/349, 368, 382; 901/6; 220/86.2

[56] References Cited

U.S. PATENT DOCUMENTS

| | | | |
|---|---|---|---|
| 2,778,390 | 1/1957 | Young, Jr. ................................. | 141/368 |
| 3,863,688 | 2/1975 | Millar et al. ............................. | 141/382 |
| 4,441,533 | 4/1984 | Snyder et al. ........................... | 220/86.2 |
| 4,881,581 | 11/1989 | Hollerback ................................. | 141/98 |
| 4,881,655 | 11/1989 | Jansky et al. ............................. | 141/349 |
| 4,995,433 | 2/1991 | Beicht et al. ............................. | 141/312 |
| 5,058,633 | 10/1991 | Sharp ........................................ | 141/98 |
| 5,186,220 | 2/1993 | Scharrer ................................... | 141/59 |
| 5,322,099 | 6/1994 | Langlois .................................... | 141/98 |
| 5,435,358 | 7/1995 | Kempka et al. .......................... | 141/312 |
| 5,465,861 | 11/1995 | Kunz et al. ............................... | 141/349 |
| 5,503,199 | 4/1996 | Whitley, II et al. ...................... | 141/312 |
| 5,509,569 | 4/1996 | Hiranuma et al. ........................ | 220/86.2 |
| 5,638,875 | 6/1997 | Corfitsen .................................... | 141/98 |
| 5,664,951 | 9/1997 | Clary et al. ............................... | 141/382 |

FOREIGN PATENT DOCUMENTS

| | | |
|---|---|---|
| 0025333 | 3/1981 | European Pat. Off. . |
| 0230890 | 1/1987 | European Pat. Off. . |
| 0597314 | 10/1993 | European Pat. Off. . |
| 9405592 | 9/1993 | WIPO . |
| WO9405592 | 3/1994 | WIPO . |

*Primary Examiner*—J. Casimer Jacyna
*Attorney, Agent, or Firm*—Alfred J. Mangels

[57] ABSTRACT

An adapter for automatically fueling automotive vehicles, primarily cars, wherein a robot which includes a robot head that is movable in relation to the robot and can via a positioning system be docked with the adapter (3). The adapter is intended to be fastened to the upper orifice of the fuel-tank pipe (2) and includes a conical part.

The present invention is characterized in that the adapter (3) includes a base part (13) and an adaptation funnel (14), wherein the base part (13) is intended to be fastened to the fuel-tank pipe (2), and wherein the base part has an opening (16); in that the adaptation funnel (14) projects out from the base part (13); in that the adaptation funnel (14) is rotatable relative to the base part about the longitudinal axis (17) of the base part, thereby enabling the adapter (3) to be positioned correctly on the fuel-tank pipe (2) in a rotational direction.

10 Claims, 3 Drawing Sheets

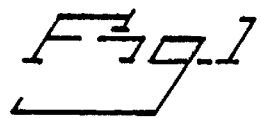
PRIOR ART
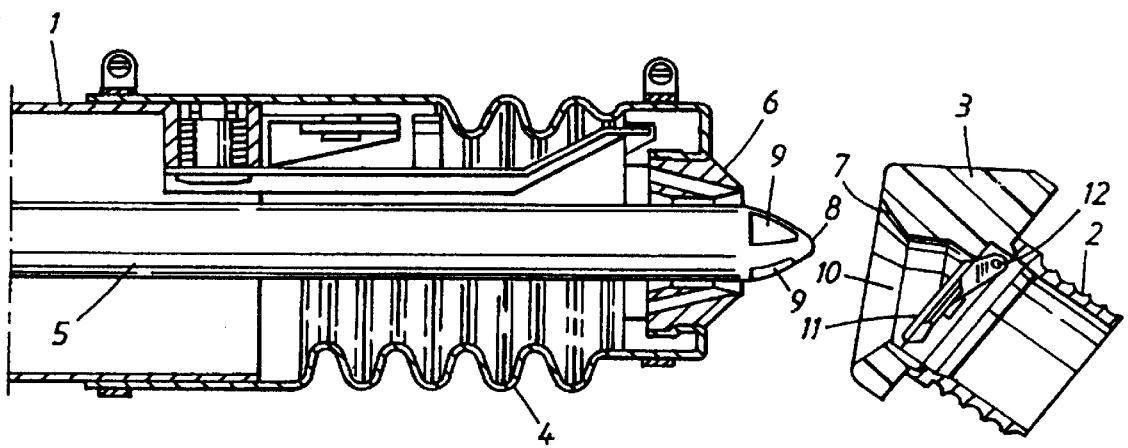
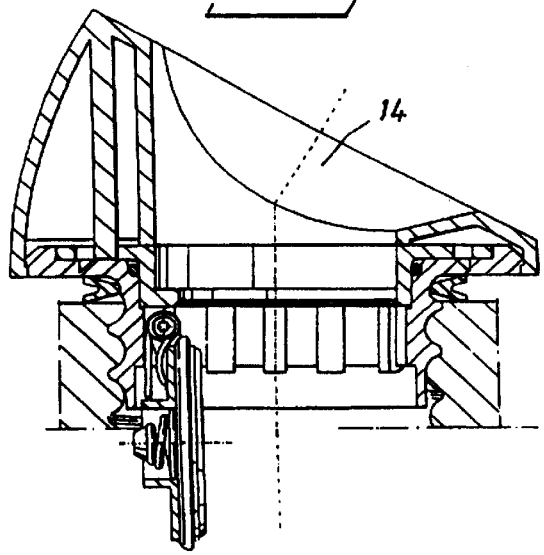

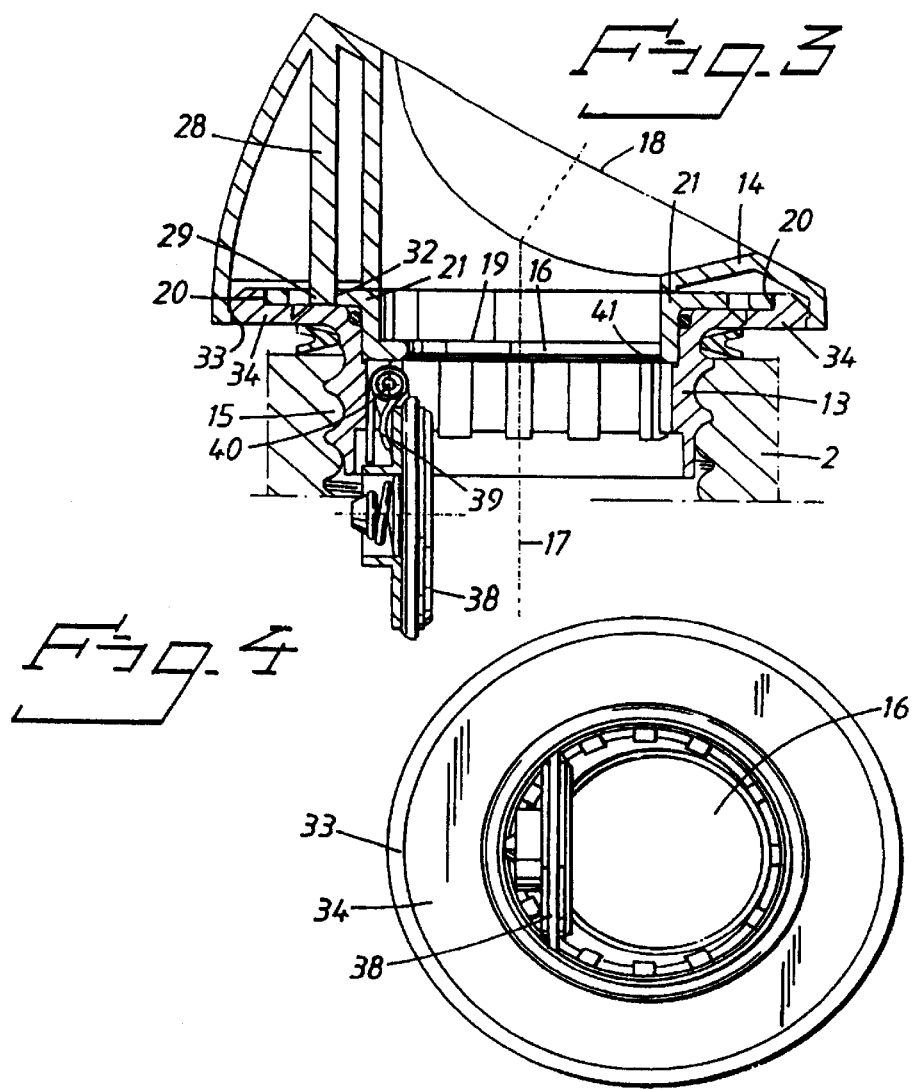
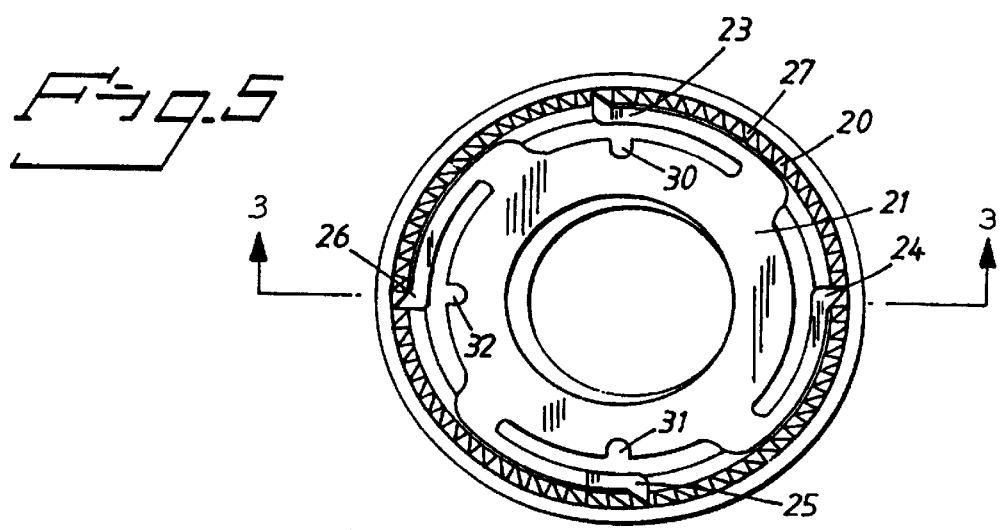

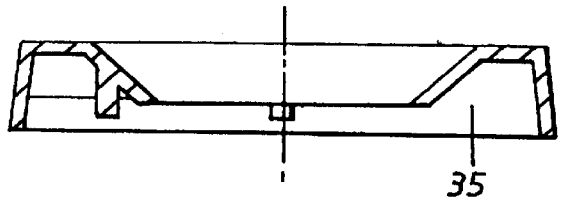
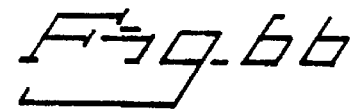
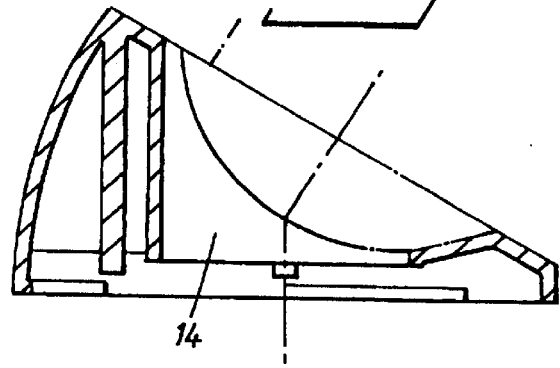
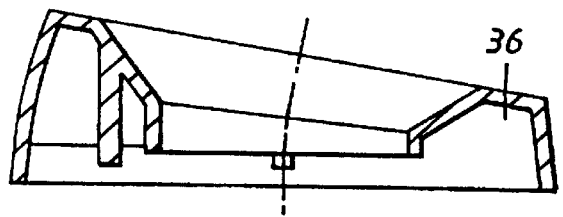
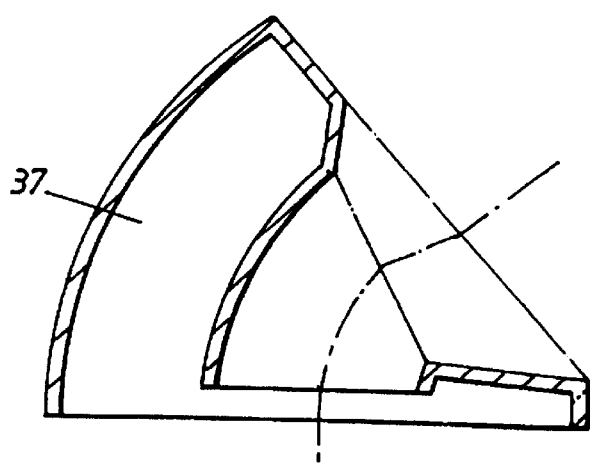

001
ADAPTER FOR AUTOMATIC FUELING OF VEHICLES

BACKGROUND OF THE INVENTION

The present invention relates to an adapter for the automatic refueling of automotive vehicles.

Swedish Patent Specification No. 8901674-5 describes apparatus for the automatic refueling of automotive vehicles, primarily cars, in which a robot which includes a robot head having a fueling nozzle or like device is adapted to move the fueling nozzle automatically from a rest position to a vehicle fueling position in response to sensing and control means, subsequent to having placed the vehicle in a predetermined position relative to the robot.

According to this patent specification, the refueling nozzle includes a rigid, first tubular element, preferably a metal tube, which is intended to be moved by the robot to an adapter which is provided with a hole and which is attached to the upper orifice of the vehicle fuel-tank pipe. A flexible second tube, preferably a plastic tube, is arranged within the first rigid tube for movement from a first end position in which the outer, free end of the second tube is located within the first tube, to a second end position in which the second tube projects out from the first tube.

A tube connection is provided between said hole and the vehicle fuel-tank pipe. The robot is constructed to move the free end of the first tube into abutment with or to a position in the immediate vicinity of the adapter in a first step and to move the free end of the second tube out of the first tube and down into said tube connection or down into the fuel-tank pipe of the vehicle in a second step, and to pump fuel through the second tube and down into the fuel tank of the vehicle in a third step.

When refueling of the vehicle is completed, the robot functions to repeat the two first-mentioned steps, but in the reverse order.

The apparatus described in the aforesaid patent publication includes a positioning system in which a transceiver unit operating at microwave frequency is mounted on the robot head, and a passive transponder which is placed in the vehicle in a predetermined position relative to the fuel-tank pipe.

Swedish Patent Specification No. 9202549-3 also describes apparatus for the automatic refueling, including an adapter which is intended to be fitted to the fuel-tank pipe of a vehicle. The adapter has a conical part which is intended to coact with the first pipe but also with the free end of the second pipe when the second pipe is passed down through the adapter into the fuel-tank pipe.

Since the fuel-tank pipe orifices of generally all vehicles define an angle with the vertical plane, it is required that the conical part slopes to a lesser extent in the vertical plane and that it preferably lies in the vertical plane, since the first and second pipes of the robot are moved horizontally towards the vehicle as the robot docks therewith.

Since in practically all cases the adapter thus is constructed so that its bottom orifice at which the adapter is attached to the orifice of the fuel-tank pipe defines an angle which is different to the angle defined by the upper orifice at which docking takes place, it is essential that the adapter is positioned on the fuel-tank pipe in a correct position of rotation.

SUMMARY OF THE INVENTION

The present invention thus relates to an adapter for the automatic fueling of automotive vehicles, primarily cars, wherein there is provided a robot which includes a robot head which is movable relative to the robot so as to enable the robot head to be brought to a predetermined position relative to the vehicle fuel-tank pipe by means of a positioning system and therewith docked with said adapter, wherein the adapter is intended to be fastened to the upper orifice of the fuel-tank pipe and includes a conical part, wherein the robot head includes a pipe whose free forward end is intended to project down to a position in the fuel-tank pipe upon completion of said docking procedure, whereafter fuel is delivered through said pipe, and wherein the invention is characterized in that the adapter includes a base part and an adaptation funnel, wherein the base part is intended to be secured to the fuel-tank pipe in coaction with fastener means provided on the fuel-tank pipe, and wherein the base part includes an opening; in that the adaptation funnel projects out from said base part; and in that the adaptation funnel can be rotated relative to the base part about the longitudinal axis of said base part, thereby enabling the adapter to be correctly positioned rotationally on the fuel-tank pipe.

BRIEF DESCRIPTION OF THE DRAWINGS

The present invention will now be described in more detail partly with reference to an exemplifying embodiment thereof shown on the accompanying drawings, in which FIG. 1 is a sectional side view of the front part of the robot head and shows the robot head with an adapter fastened to a fuel-tank pipe prior to completion of a docking procedure in accordance with known techniques;

FIG. 2 is an axial cross-sectional view of an inventive adapter;

FIG. 3 illustrates the adapter of FIG. 2 in larger scale;

FIG. 4 illustrates the adapter of FIG. 2 from beneath;

FIG. 5 illustrates the adapter of FIG. 2 from above with an adaptation funnel removed; and FIGS. 6a–6d illustrate various adaptation funnels.

DETAILED DESCRIPTION OF THE INVENTION

FIG. 1 illustrates the known technique. The Figure is taken from Swedish Patent Specification No. 9202549-3 and is a side view of the front part of a robot head 1 with said part in a position prior to final docking of the robot head with an adapter 3 attached to the fuel-tank pipe 2 of the vehicle. The robot head belongs to a robot which is not shown. The robot head 1 is movable in relation to the robot, so that the robot head can be brought to a predetermined position in relation to the fuel-tank pipe 2 of the vehicle, or more specifically in relation to the adapter 3.

The robot head is positioned relative to the adapter by means of a positioning system which includes a first part located on the robot head and a second part which is placed in a predetermined position on the vehicle. The positioning system is preferably of the kind defined in the introduction, wherein the second part is a passive transponder which is mounted on the vehicle in the vicinity of or actually on the vehicle fuel-tank flap. The positioning system, however, is not significant to the present invention.

The robot head includes a fueling nozzle which, in turn, includes an outer tube 4 and an inner tube 5 which can move axially in the outer tube 4. The free forward end of the outer tube 4 has a frusto-conical part 6 which during said positioning procedure is intended to dock with a correspondingly frusto-conical part 7 belonging to the adapter 3 attached to the upper orifice of the fuel-tank pipe. The forward free end 8 of the inner tube 5 is intended to be extended to a position further down in the fuel-tank pipe upon completion of the docking procedure, whereafter fuel is delivered through the inner tube.

The outer tube 4 is sufficiently supple to enable docking to take place provided that the tip of the inner tube is positioned radially inwards of the base 10 of the conical part of the adapter. When docking is completed, the respective conical surfaces 6, 7 of the robot head and the adapter will abut one another.

The adapter is preferably provided with a cover 11 which is hinged on a shaft 12. The cover is shown in its closing position in FIG. 1. As the inner tube 5 is pushed out of the outer tube 4 and down into the fuel-tank pipe 2, the cover is swung down forcibly into the fuel-tank pipe 2 against a spring force.

In accordance with the invention, the adapter includes a base part 13 and an adaptation funnel 14, see FIG. 3. The base part 13 is screwed onto the thread 15 of the fuel-tank pipe 2. Alternatively, the base part is affixed to the fuel-tank pipe by means of a bayonet fitting. The base part 13 includes an opening 16. The funnel 14 projects out from the base part 13 and includes said conical part.

The funnel 14 can be rotated relative to the base part about the longitudinal axis 17 of the base part 13, thereby enabling the adapter to be correctly positioned rotationally on the fuel-tank pipe 2.

By correct rotational positioning of the adapter is meant that the adaptation funnel is rotated to a position in which the plane of the outwardly facing opening 18 defines the smallest angle with the vertical plane. The correct rotational position of the adapter can be marked on the adaptation funnel, for instance with an upwardly pointing arrow and appropriate text at the correct position of rotation. This enables the adapter to be easily twisted-in correctly, irrespective of its rotational position when screwed onto the fuel-tank pipe. This is due to the screwthread on the fuel-tank pipes of different cars, even though the same thread pitch and the same thread are used on many makes of cars.

When the plane of the outer opening 18 on the adaptation funnel and the opening 19 facing towards the base part define a large angle therebetween, there will be found a rotational position in which the outer opening 18 of the adaptation funnel defines a maximum angle with the vertical plane, this position making it considerably more difficult to dock a robot head, or will even make docking impossible.

According to one highly advantageous embodiment of the invention, the funnel 14 can only be rotated, or turned, relative to the base part 13 in the same direction as the base part is turned as it is screwed onto the threads of the fuel-tank pipe. This enables the adapter to be easily unscrewed from the fuel-tank pipe, in the manner of a conventional fuel-tank cap. It has namely been found that not all manually operated fuel-pump nozzles can be inserted down into an adapter. It is therefore necessary to be able to remove the adapter easily when fueling a vehicle manually. In this regard, the invention enables the adapter to be removed easily and to be easily positioned correctly when screwing the adapter onto the fuel-tank pipe.

According to one preferred embodiment of this latter feature, the upper portion of the base part 13 includes a toothed ring 20 which faces inwardly of the base part (see FIGS. 3 and 5) and which is intended to coact with a plate 21 having one or more radially extending resilient hooks 23–26 which engage the toothed ring 20. The funnel 14 is rotatably attached in the base part 13, but is in non-rotatable engagement with the plate 21. The teeth 27 and the hooks 23–26 are designed so that the funnel 14 can only be rotated relative to the base part 13 in the same direction as the base part is rotated when screwing the same onto the thread of the fuel-tank pipe 2.

The adaptation funnel 14 includes two or more downwardly extending projections 28, of which only one is shown in the Figures, and the bottom ends 29 of said projections engage in recesses 30–32 provided in the plate 21, therewith holding the funnel 14 in non-rotational engagement with the plate 21.

According to one preferred embodiment, the funnel 14 is removably mounted on the base part 13.

According to another preferred embodiment, when the base part 13 is fitted in position on the fuel-tank pipe 2, the base part is located completely below the orifice of the fuel-tank pipe with the exception of a radially and outwardly projecting collar 34 immediately above said orifice. This embodiment has two advantages. Firstly, there is a larger space between the fuel-tank pipe orifice and the fuel-tank cover, which is normally seated flush with the side of the car body, than when the base part extends markedly above the pipe orifice. Secondly, the important part of the base part lies well protected, as described below.

The funnel 14 is preferably fastened at the periphery of said collar, by virtue of the lower part of the adaptation funnel engaging a peripheral edge 33 on the base part, either completely or partially.

Because the funnel 14 can be exchanged, the base part can be made the same for all cars with a given screwthread on the fuel-tank pipe. There is then fitted on a base part an adaptation funnel which has an appropriate angle between the plane of its outer orifice 18 and the plane of its lower orifice 19 in relation to the model of car concerned. It is the intention that the plane of the outer funnel orifice will define the smallest possible angle with the vertical plane. In the case of certain makes of vehicle, the space between the fuel-tank pipe orifice and said fuel-tank cover makes it impossible to provide an adaptation funnel with which the plane of said orifice coincides with the vertical plane.

FIGS. 6a–6d illustrate examples of adaptation funnels 14, 35–37 which have mutually different angles between the planes of the orifices 18, 19. FIG. 6a shows a funnel 35 in which the plane of the orifices are mutually parallel. This adaptation funnel is thus intended for vehicle models in which the plane of the fuel-tank pipe orifice coincides with the vertical plane, or defines a small angle therewith.

According to one highly preferred embodiment, the base part 13 is constructed to extend down into the fuel-tank pipe. A pivotal cover 38 of known kind is swung to one side against the force of a spring 39 as a tube on the robot is moved down through the adapter and into the fuel-tank pipe. The cover 38 is pivotally mounted on a shaft 40 in that part of the base part which is located beneath the orifice of the fuel-tank pipe when said base part is fitted on said pipe. FIG. 3 shows the cover swung to one side. The cover 38 of this embodiment will lie against a seating 41 in its non-activated position so as to seal the fuel-tank pipe against the surroundings and lie within the relatively strong and robust fuel-tank pipe and be well-protected mechanically thereby. The fuel-tank pipe is generally made of metal or plastic. The fact that the cover 38 is well-protected has significance in the event of collisions, where leakage of fuel is undesirable.

The present invention thus solves the problem mentioned in the introduction and provides a simple and reliable device which affords a high degree of flexibility with regard to adaptation to vehicles of different makes.

It will be understood that the detail design and configuration of the adapter may be different to that described with reference to the above exemplifying embodiments thereof.

The invention shall not therefore be considered to be limited to the aforedescribed and illustrated embodiments, since modifications and variations can be made within the scope of the following claims.

What is claimed is:

1. An inlet pipe adapter for use with an automatic fueling system which includes a robot head positionable in surface contacting relationship with respect to the fuel tank inlet pipe of an automotive vehicle, said adapter comprising a base member having a first fastening means for securing the base member to the fuel tank inlet pipe at an outer orifice thereof and in fixed, non-rotational relationship therewith, said base member having a second fastening means spaced outwardly from the first fastening means, the base member including an opening to permit the passage of fuel therethrough, an adaptation funnel connected with the second fastening means and extending outwardly from and rotatably carried by said base member to enable the adaptation funnel to be axially retained on the base member at a fixed axial position and to be rotatably positioned on the base member for rotation relative to the fuel tank inlet pipe to orient the adaptation funnel relative to the fuel tank inlet pipe of a specific vehicle for proper docking of the robot head with the adaptation funnel.

2. An adapter according to claim 1, wherein the adaptation funnel includes an inner orifice located adjacent the outer orifice of the fuel-tank pipe, and wherein the inner orifice defines a plane that is oriented at an angle with a plane defined by an outer orifice of the funnel at which docking of the robot takes place.

3. An adapter according to claim 1, wherein said base member is threadedly connected to the fuel tank pipe and the adaptation funnel is connected with the base member so that it can only be rotated in relation to the base member in the same direction as the base member is rotated when installing said base member onto the fuel-tank pipe.

4. An adapter according to claim 3, wherein the base member includes an upper part that carries a ring having teeth that face inwardly of the base member, a plate provided with at least one radially extending, resilient hook which engages teeth on said ring, wherein the adaptation funnel is rotatably attached to the base member in non-rotational engagement with the plate, wherein the teeth and the at least one hook are configured so that the adaptation funnel can only be rotated relative to the base member in the same direction as that in which the base part is rotated as it is screwed onto threads carried by the fuel-tank pipe.

5. An adapter according to claim 1, wherein the adaptation funnel is removably mounted on the base member.

6. An adapter according to claim 1, wherein the base member extends into the fuel-tank pipe, and a pivotal cover is pivotally mounted on the base member below the outer orifice of the fuel-tank pipe when said base member is fitted on said pipe, and wherein said cover is swung to one side against the action of a spring as a robot-carried tube is moved down through the adapter and into the fuel-tank pipe.

7. An adapter according to claim 6, wherein when fitted to the fuel-tank pipe the base member is located completely below the outer orifice of the fuel-tank pipe, with the exception of a radially and outwardly projecting collar immediately above the outer orifice of said pipe.

8. An adapter according to claim 7, wherein the adaptation funnel is fastened to the collar at a peripheral edge of the collar.

9. An adapter according to claim 1, wherein the adaptation funnel includes an outwardly flaring frustoconical funnel surface that terminates in an outer opening and that is engageable with a corresponding frustoconical surface of the robot head.

10. An adapter according to claim 9, wherein the outer opening of the adaptation funnel coincides with a maximum cross-sectional area portion of the frustoconical funnel surface, and wherein the cross-sectional area of the frustoconical funnel surface progressively decreases in an inward direction to terminate at an inner opening that communicates with the base member opening.

* * * * *